F. F. FERGUSON.
CULTIVATOR.
APPLICATION FILED JAN. 24, 1914.
1,284,631.
Patented Nov. 12, 1918.
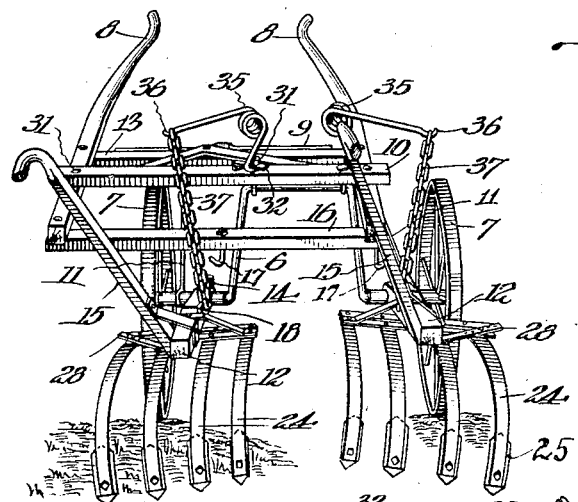

UNITED STATES PATENT OFFICE.

FINTON F. FERGUSON, OF MURFREESBORO, NORTH CAROLINA.

CULTIVATOR.

1,284,631.  Specification of Letters Patent.  Patented Nov. 12, 1918.

Application filed January 24, 1914. Serial No. 814,113.

*To all whom it may concern:*

Be it known that I, FINTON F. FERGUSON, a citizen of the United States, and a resident of the town of Murfreesboro, in the county of Hertford, State of North Carolina, have invented certain new and useful Improvements in Cultivators, of which the following is a specification.

This invention relates broadly to agricultural implements and more particularly to improvements in wheeled cultivators.

The principal object of this invention is to construct the parts of a double beamed wheeled cultivator so that the forces acting upon each beam may be so balanced as to cause the beam to draw straight.

Another object of this invention is to provide a construction for a wheeled cultivator wherein the plows carried by a single beam may be adjusted with reference to each other and the side draft caused by said adjustment may be balanced by an adjustable spring mechanism.

Still other and further objects of this invention will in part be obvious and will in part be pointed out in the specification hereinafter following by reference to the accompanying drawings in which like characters represent like parts throughout the several views thereof.

Figure 1 is a perspective view showing the arrangement of the springs, side chains, etc.

Fig. 2 is a detail plan view looking directly down upon the plow beams.

Fig. 3 is a diagrammatic view showing the paths of the plows through the earth.

It is well known in the cultivator art to arrange the support for the plows in such manner that the plows may be adjusted with reference to each other to change the space between the furrows of the individual plows. In this type of adjustment it is usual to mount the plows diagonally in such manner that their points are set in echelon. When this is done it will be noted that the forward plow breaks the earth an appreciable distance ahead of the next succeeding plow and so on throughout the series. Where this is true the plow beam draws sidewise toward the advancing plow, and where the plows are mounted upon beams, as in a double plow cultivator, the beams draw together and the operator is required to continually exert forces to keep the beams straight to overcome this side draft, the result of this being very tiresome on the arms of the person using the cultivator.

The cause of this side draft is very easily explained by referring to Fig. 3 of the drawings wherein it will be noted that the advancing plow 1 breaks the earth on both sides of the plow and that the next succeeding plow 2 as it advances meets solid unbroken earth on the left, but the earth to the right has been broken by the passage of the preceding plow 1. This same condition is true for plow 4 and also for plow 5. The side draft it will be seen is due to the fact that where a thing is free to swing, or move, it will seek the path of least resistance, consequently since each succeeding plow engages hard unbroken earth on one side and loose broken earth on the other, the plow will tend to follow the path of least resistance and will draw into the broken earth. The effect of the multiplicity of plows is to multiply the side draft, which is in the direction of the arrow A, by the number of plows in the series. It will also be noted that if the plows are adjusted to decrease the space between the furrows, the right sides of the plows will encounter the broken earth. Consequently the closer the plows are together the more tendency there is for succeeding plows to crowd into the furrow of the preceding plow and therefore the more side draft.

Applicant overcomes this difficulty by arranging adjustable springs connected by chains to the plow beam in such manner that the springs draw on the chains in the direction opposite to the side draft due to the plows and consequently the force exerted by the springs counterbalances this objectionable side draft and the plow then draws in a straight line as it should. Since it is desirable to arrange the plow springs so that they may be adjusted with reference to each other to bring the furrows closer together, applicant has arranged the counterbalancing springs also adjustable, by means of which construction a new balance of forces may be attained for each adjustment of the plows so that the beams will draw straight under any adjustment of the plows with reference to each other.

Referring now to the drawings, the arch axle 6 is mounted upon the wheels 7, and supports upon the upper portion of the arch a cross bar 10, which is secured at its outer ends to the shafts 8. The shafts are braced by the usual front cross bar 9. Extending from points on the arch axle 6 adjacent each of the wheels 7 are braces 11 secured at their opposite ends to the front cross bar 9, whereby the draft on the shafts is delivered to the arch axle adjacent the connections for the plow beams. The plow beams 12 are connected to the arch axle 6 by the usual swivel connection 14, and the beams are provided with handles 15 to enable the operator to properly guide the plow beams during the operation of the cultivator. The rear cross bar 16, carried by the shafts 8, is provided with hooks 17, upon which the loops 18 on the beams 12 are adapted to be engaged to enable the plows to be held out of the ground when the cultivator is being moved from place to place. All of these hereinbefore described parts are well known and common in the art, and are only used in this case as illustrative of a general type of cultivator mechanism.

The plow beams 12 carry parallel iron bars 19 and 20, which bars are pivoted on the bolts 21 and 22 respectively, which pass through the plow beams 12. These parallel iron bars 19 and 20 form a support for the spring fingers 24, upon which the plow points 25 are mounted. Braces 26 are mounted upon the bolts 22 and extend inwardly to the inner end of the bars 20, at which points they are attached by means of one of the bolts 27 that are used in mounting the spring fingers 24 to the parallel iron bars 19 and 20. Flat bars 28 extend from beneath the beams 12 outwardly and are provided with a plurality of openings 29 through which certain of the outer bolts 27, previously referred to, are adapted to pass and secure the flat bars 28 to the outer ends of the parallel bars 20. By placing the bolts 27 in the various openings 29 in the bars 28, adjustment of the distance between the individual spring fingers 24 is secured.

The arch axle 6 is attached to the middle cross bar 10 of the shafts by means of eye-bolts 31, each of which carries on its upper end a plate 32 seated over the end 34 of one of the springs 35. The end portions of the springs comprise U-shaped members having long parallelly extending side arms which permit the springs as a whole to be rotated or adjusted laterally a considerable extent with relation to the eye-bolts for a purpose to be hereinafter more fully pointed out. This adjustment is accomplished by merely loosening the fastening nuts which maintain the plates 32 in contact with the springs and then moving the springs in the desired manner. The springs are provided on their upper and outer ends with hooks 36 which engage links of the chains 37, extending inwardly with relation to a vertical plane and securely fastened at their lower ends to the plow beams 12. Due to the inclination of the chains it will be apparent that the springs exert an upward and outward pull on each of the plow beams 12. The amount of this pull and the angles through which it acts may be varied at will by adjusting the springs in the manner described. The tension of the springs is such that in normal conditions they exert but little pull on the plow beams, this pull gradually increasing when the cultivator is in use and the plow points tend to move inwardly as clearly shown in Fig. 3. Thus the springs have a tendency to always maintain the plow points in their proper operating positions under all conditions of operation.

It will be noted that when the angular adjustment of the parallel iron bars 19 and 20 is changed by means of changing the bolts 27 with respect to the flat bars 28, the springs 35 can also be changed to cause them to draw chains 37 outwardly, as shown in Fig. 1, thereby exactly counterbalancing the side draft on the plow beams. The result of this arrangement is to enable the operator at all times to so balance the beams that they will draw straight, such an operation being very desirable.

Having thus described my invention what I desire to claim is:—

In a wheeled cultivator the combination of a wheeled support, a main frame mounted on said wheeled support, plow beams pivotally mounted on said wheeled support, a plurality of plows adjustably mounted on each beam, said plows being arranged on each beam in echelon with the advancing plow arranged on the inner side of the plow beam and with the path of the succeeding plows on the beam arranged sufficiently close together that each preceding plow breaks the ground adjacent the succeeding plow whereby said plow beams tend to draw together, springs provided with central coil portions and outwardly extending arms, adjustable mountings for said springs on the main frame whereby the arms of said springs may be set to pull upwardly and outwardly, and chains operatively connecting the ends of said arms with the plow beams in such manner that the said springs counterbalance the inward draw to the plow beams.

FINTON F. FERGUSON.

Witnesses:
ROGER WATSON,
W. A. MCGLOHON.